Patented May 5, 1942

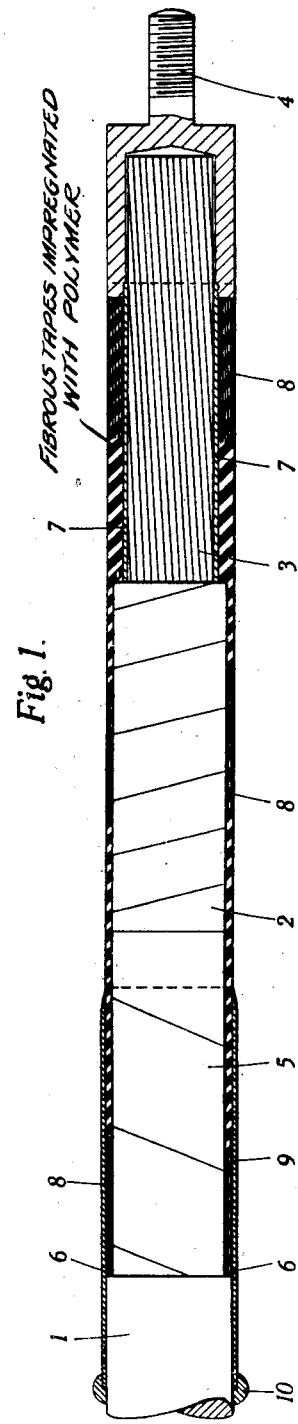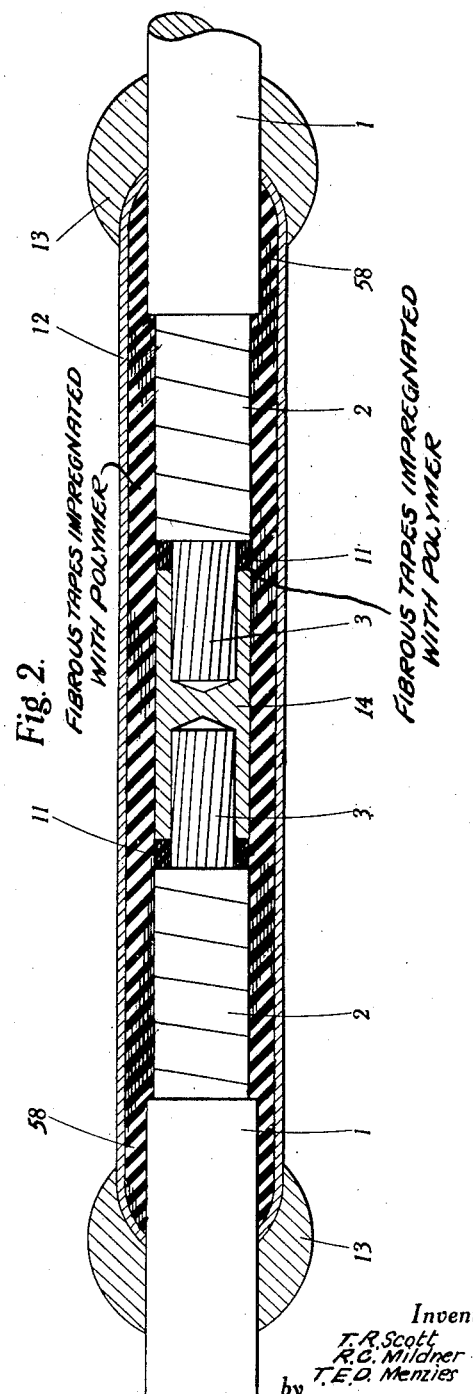

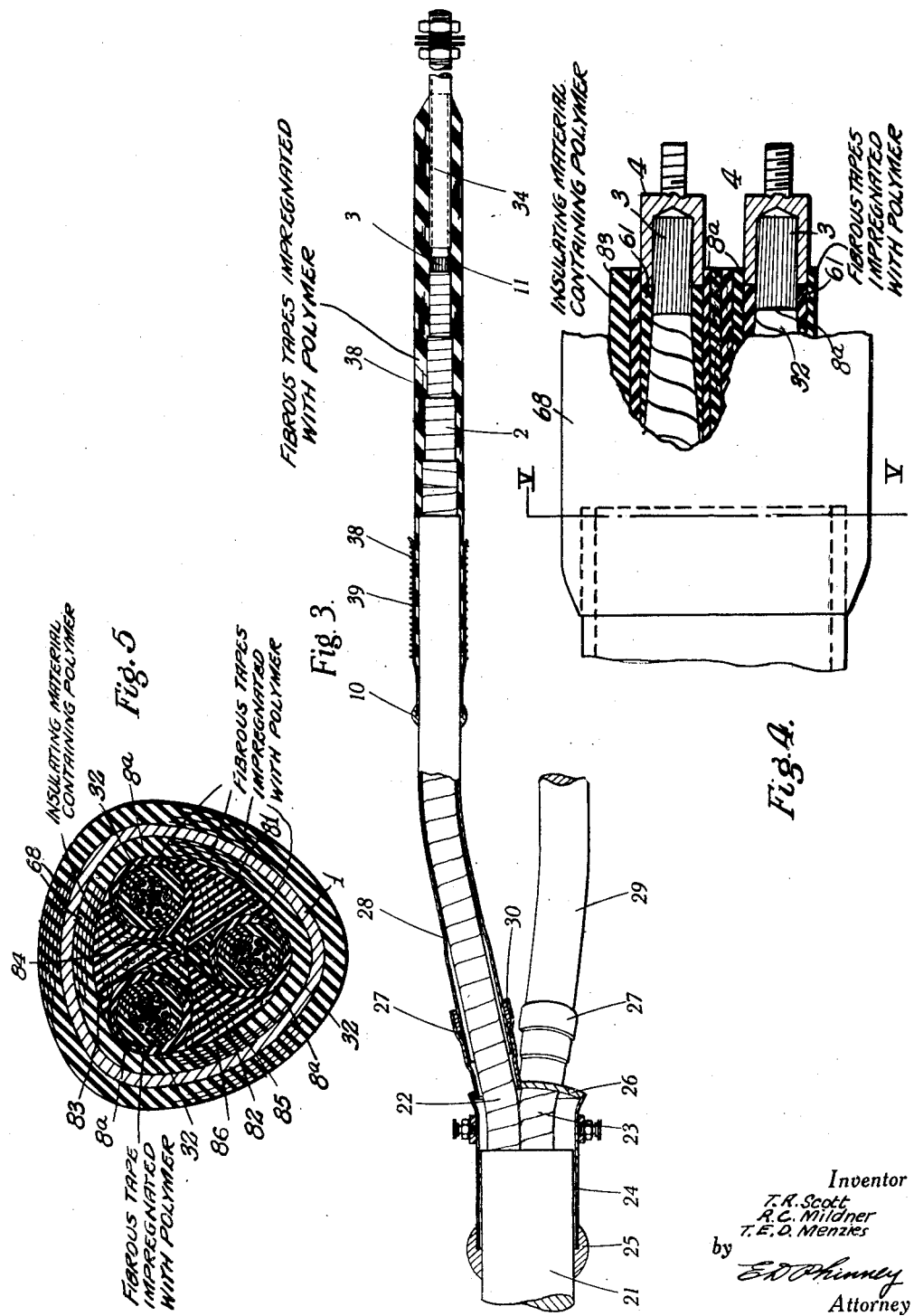

2,282,003

UNITED STATES PATENT OFFICE 2,282,003

ELECTRIC CABLE

Thomas Robertson Scott, Raymond Charles Mildner, and Thomas Edward David Menzies, London, England, assignors to International Standard Electric Corporation, New York, N. Y.

Application December 20, 1938, Serial No. 246,828
In Great Britain December 24, 1937

8 Claims. (Cl. 174—20)

This invention relates to electric cables and more particularly to method of preparing barrier joints and terminations in impregnated power cables.

In our prior United States Patent No. 2,105,567 and our copending United States application Serial No. 235,182 filed October 15, 1938, we have described methods of forming barriers in power cables. In the former we have disclosed a method which requires a considerable amount of monomeric liquid and hence considerable heating to form a polymer. In the latter we have disclosed a method which overcomes this difficulty. The present invention relates to an improvement in this latter method.

Considering polymerised barriers in general, it may be stated that one practical difficulty encountered is to provide an effective seal between the outer surface of the built-up insulation and the inner surface of the protective sleeve disposed therearound. In our earlier United States Patent No. 2,105,567 referred to above, the seal is provided by flooding the joint insulation with monomer after building up of the insulation and disposal of a protective sleeve around the insulation. Such a method is, however, not satisfactory in our co-pending application, in view of the fact that quantities of free monomer within the cable should clearly be avoided if the heating period required is to be reduced. Various alternative sealing methods are therefore put forward in our co-pending application, such as the employment of materials which are swollen by monomer, e. g. rubber or synthetic rubber, to afford a seal in the gap between the insulation and the protective sleeve.

One object of this invention is to provide an improved method of making a barrier joint or termination, in which there is substantially no possibility of the cable compound leaking between the built-up insulation and the protective sleeve and in which no large quantities of free monomer have to be applied.

The invention will be more readily understood after a consideration of the drawings included by way of example, which show in Figs. 1 and 2 respectively a longitudinal sectional view of a modified form of termination and joint according to the invention in a single core cable. Fig. 3 shows in side elevation and partly in section a multi-core cable embodying our invention; Figs. 4 and 5 are side and end views in partial section and in full section, respectively, of a multi-core cable having the worming spaces thereof filled with fibrous material impregnated with a polymer.

Referring first to Fig. 1, I represents the cable sheath, 2 the cable insulation which has been uncovered by removal of a portion of the cable sheath I, and 3 is the stranded conductor to the end of which a metal ferrule 4 is secured for connecting purposes. Over the uncovered cable insulation 2 adjacent to the cable sheath I, copper foil 5 is lapped, and is welded or sweated at 6 to the end of the cable sheath I. A brass or like tube 7 is slipped over the conductor 3 prior to connection of the metal ferrule in order to retain the strands of the conductor 3 in position. Fibrous tapes impregnated with polymerised material are then applied to form the built-up insulation 8 over the brass or like tube 7, over the uncovered cable insulation 2 and over the copper foil 5 until the built-up insulation is substantially flush with the cable sheath I. During the application, the tapes are basted at intervals with a suitable polymer to cause the impregnated tapes to adhere to one another. A brass or like sleeve 9 is then slipped over the built-up insulation and is wiped to the cable sheath at 10. It will be understood that in this embodiment the built-up insulation overlaps an extension of the cable sheath I, i. e. the copper foil 5 which forms the protective sleeve referred to above. The term "protective sleeve" is intended to include any protective covering for the cable which may be applied over the insulation, for example, the usual lead or lead alloy cable sheath, an extension thereof, a sleeve provided over the built-up insulation of a joint, an end cap such as that described later in the present specification, or an extension of such an end cap.

In Fig. 2 parts corresponding to those described in Fig. 1, are given the same reference numerals, and in view of the fact that a joint may be considered as two abutted terminations, it is believed that Fig. 2 will be readily understood. The sheath I of each cable length is removed to uncover a length of cable insulation 2 which is in turn removed to uncover a length of conductor 3. The insulation may be removed for a length corresponding to that from which the lead sheath has been removed or alternatively, the conductor may be exposed for a short length after which the insulation may be tapered back towards the lead sheath. The conductors 3 are then jointed in the usual way by means of the ferrule 14, and the gap between the ferrule 14 and the insulation 2 at each side of the joint is

to each core and insulation is applied in a manner similar to that described above for the construction of a barrier in a single core cable, i. e. insulation is built up around the protruding cores in such a manner as to overlap the exit pipes of the end cap. End caps as described above may also be employed in the preparation of joints in multi-core cables in which case the end of each cable length may be provided with an end cap as described in connection with the termination, the protruding ends of the conductors being jointed together and the insulation being built up and overlapped as described. Thereafter a casing, for example of lead, may be applied over the joint. By the above methods using end caps the necessity of forming barriers in the worming spaces of multi-core cables is avoided.

In forming a termination in a screened type multi-core cable therefore according to this embodiment of the invention the cores are threaded through an end cap, which may be of metal or insulating material, provided with an exit pipe for each core, the end cap is sealed to the cable sheath and insulation is built up around the protruding portion of each core according to our co-pending United States application Serial No. 235,182 filed October 15, 1938, and is caused to overlap the end of each exit pipe or an extension thereof whereby each core is terminated as an individual cable and leakage of compound is avoided. In the case of belted type cables an outer belt of insulation is provided or the insulation of each core is built up to an extent to render belt insulation unnecessary; the belt or further insulation need not however, afford barrier action the only requirements for such insulation being electrical. Further in the case of belted type cables the end cap should preferably be entirely of insulating material.

As has been explained above these end caps may also be employed in the manufacture of joints in which case two end caps are utilised each secured to the sheath of one of the cable lengths. In the screened type construction each individual core may be provided with a lead sheath an overall outer sheath being provided, but in the belted type case additional insulation or an overall belt extending from end cap to end cap must be provided to meet the electrical requirements.

In order that this embodiment of the invention may be more clearly understood, reference is directed to Fig. 3 of the accompanying drawings, which show by way of example a longitudinal sectional view of a termination of a multi-core screened type cable. Referring to the drawings, 21 represents the cable sheath and 22, 23 are two insulated screened conductors. There may obviously be additional conductors, but only two are shown for the sake of clarity. Over the end of the cable sheath 21 a metal end cap 24 is slipped and is secured to the cable sheath at 25 by means of a wipe joint. The end cap is provided with a metal, e. g. brass, closure member 26, having a number of exit pipes 27 corresponding to the number of conductors in the cable, and through each pipe 27 an insulated screened conductor is threaded. Each screened conductor is then provided with an individual lead sheath 28, 29 and the exit pipes are soldered or otherwise secured at 30 thereto so that each lead sheath forms an extension of an exit pipe. Each core may then be terminated in a manner similar to that described in connection with Fig. 1. Attention may, however, be directed to the fact that in the embodiment shown the built up insulation 38 is extended over the ferrule 34 and that the exposed part of the conductor 3 is lapped with rubber styrene tape. Also copper wires are wound over the metal sleeve 39 or metal foil, otherwise the termination illustrated in Fig. 3 for one of the cores differs only in small details from that of Fig. 1. A condenser cone may be associated with the termination of each core in which case the condenser cone may be disposed over the built-up insulation. Also, over the completed insulation a porcelain or similar housing may be provided and filled with oil or other impregnant.

Expanding the above explanation when dealing with screened type multi-core cables a metal end cap 24 and exit pipes 27 may be employed, but when dealing with a belted cable the exit pipes and end plate of the cap at all events should be of insulating material and if desired the whole assembly may be of modulating material in which case means should be provided for sealing the junction the end-cap and the metallic cable sheath.

What is claimed is:

1. A method of preparing a barrier in a fluid impregnated power cable which comprises building up the insulation around the core of said cable with fibrous tape impregnated with polymerized material, continuing the building up process until the tape overlaps the protective sleeve of the cable, basting the impregnated tape with polymerizable material during the building up process, and maintaining said polymerizable material at a polymerizing temperature after the building process is complete until polymerization occurs, whereby the risk of the impregnant within the cable leaking between the outer layer of the built-up insulation and the protective sleeve is minimized.

2. A method of preparing a barrier in a fluid impregnated power cable which comprises building up the insulation around the core of said cable with fibrous tape impregnated with polystyrene, continuing the building up process until the tape overlaps the protective sleeve of the cable, basting the impregnated tape with polymerizable material during the building up process, and maintaining said polymerizable material at a polymerizing temperature after the building process is complete until polymerization occurs, whereby the risk of the impregnant within the cable leaking between the outer layer of the built-up insulation and the protective sleeve is minimized.

3. A method of preparing a barrier in a fluid impregnated power cable having at least one which comprises tapering back the cable insulation, assembling preformed barrier sections containing polymerized material around at least one cable core in such a manner as to afford a barrier to the cable impregnant, thereafter building up the insulation by lapping the tapered insulation and preformed sections with fibrous tapes impregnated with polymerized material until the tapes overlap the protective shield of the cable, basting the impregnated tape with polymerizable material during the building up process, and maintaining said polymerizable material at a polymerizing temperature until polymerization occurs.

4. A method of preparing a barrier in a fluid impregnated, multi-core cable which comprises threading the cores through an end cap provided with an exit pipe for each core, securing the end cap to the cable sheath, applying fibrous tape impregnated with polymerized material to the portion of each core protruding from said exit pipes until the tape overlaps the end of each exit pipe, basting the impregnated tape with polymerizable material during its application, and maintaining said polymerizable material at a polymerizing temperature until polymerization occurs.

5. A method of preparing a barrier in a fluid impregnated, multi-core cable which comprises forming a barrier around each core of said cable by building up the insulation around each core with fibrous tapes impregnated with polymerized material and basting said tapes with polymerizable material during the building up process, forming a barrier consisting substantially of polymerized material in the worming spaces between said cores and building up the insulation external to all said cores with fibrous tapes impregnated with polymerized material until said tapes overlap the protective sleeve of said cable and basting the tapes with polymerizable material during the building up process, and maintaining said polymerizable material at a polymerizing temperature until polymerization occurs.

6. A method according to claim 1 further comprising the step of basting the protective sleeve with monomer before overlapping it with said tapes.

7. A method according to claim 1 further comprising the step of encircling the built-up insulation with a protecting sleeve.

8. A method according to claim 3 further comprising the step of treating the preformed barrier sections with monomer before assembling them around the core, whereby these sections will readily adhere and form a tight barrier.

THOMAS ROBERTSON SCOTT.
RAYMOND CHARLES MILDNER.
THOMAS EDWARD DAVID MENZIES.